(12) United States Patent
Sundaram

(10) Patent No.: US 10,903,913 B2
(45) Date of Patent: Jan. 26, 2021

(54) FREE AIR OPTICAL INTERCONNECT ATTACH MECHANISM

(71) Applicant: Intel Corporation, Santa Clara, CA (US)

(72) Inventor: Arvind Sundaram, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/326,971

(22) PCT Filed: Sep. 29, 2016

(86) PCT No.: PCT/US2016/054340
§ 371 (c)(1),
(2) Date: Feb. 21, 2019

(87) PCT Pub. No.: WO2018/063215
PCT Pub. Date: Apr. 5, 2018

(65) Prior Publication Data
US 2019/0199444 A1  Jun. 27, 2019

(51) Int. Cl.
*H04B 10/00* (2013.01)
*H04B 10/80* (2013.01)
*H04B 10/50* (2013.01)
*H04B 10/69* (2013.01)

(52) U.S. Cl.
CPC ......... *H04B 10/803* (2013.01); *H04B 10/503* (2013.01); *H04B 10/6911* (2013.01)

(58) Field of Classification Search
CPC ... H04B 10/11; H04B 10/112; H04B 10/1123; H04B 10/803; H04B 10/40; H04B 10/114; H04B 10/1143; H04B 10/1149; G02B 6/4246; G02B 6/4204

USPC ....... 398/118, 119, 127, 128, 129, 130, 131, 398/135, 136, 164, 158, 159; 385/88, 89, 385/90, 92, 93, 14
See application file for complete search history.

(56) References Cited

U.S. PATENT DOCUMENTS

| | | | |
|---|---|---|---|
| 7,371,014 B2 * | 5/2008 | Willis | G02B 6/3887 385/24 |
| 2003/0142913 A1 | 7/2003 | Li | |
| 2005/0202727 A1 | 9/2005 | Andre et al. | |
| 2012/0039562 A1 | 2/2012 | Tan et al. | |
| 2013/0087690 A1 | 4/2013 | Sloey et al. | |

(Continued)

FOREIGN PATENT DOCUMENTS

WO  WO-2018063215 A1  4/2018

OTHER PUBLICATIONS

"International Application Serial No. PCT/US2016/054340, International Search Report dated May 24, 2017", 4pgs.

(Continued)

*Primary Examiner* — Hanh Phan
(74) *Attorney, Agent, or Firm* — Schwegman Lundberg & Woessner, PA

(57) ABSTRACT

A system includes a communication interface including separate electrical connectors configured to communicate power and ground using electrical conductors, the communication interface includes a free-air optical interconnect including at least one of: a laser emitter configured to transmit laser energy across an air gap to a separate device; or a photodiode configured to detect laser energy received across the air gap from the separate device.

17 Claims, 7 Drawing Sheets

(56) References Cited

U.S. PATENT DOCUMENTS

2013/0266026 A1   10/2013  Mccormack et al.
2015/0086210 A1*  3/2015  Quiet .................... G06F 1/1616
                                                        398/116
2019/0199446 A1*  6/2019  Sundaram ............ H04B 10/803

OTHER PUBLICATIONS

"International Application Serial No. PCT/US2016/054340, Written Opinion dated May 24, 2017", 7 pgs.
"International Application Serial No. PCT US2016 054340, International Preliminary Report on Patentability dated Apr. 11, 2019", 9 pgs.

* cited by examiner

FREE AIR OPTICAL INTERCONNECT ATTACH MECHANISM

CLAIM OF PRIORITY

This patent application is a U.S. National Stage Application under 35 U.S.C. 371 from International Application No. PCT/US2016/054340, filed Sep. 29, 2016, published as WO2018/063215, which is incorporated herein by reference.

TECHNICAL FIELD

Embodiments pertain to high-speed interconnections in electronic systems, and more specifically to an optical communication interface attach mechanism.

BACKGROUND

Electronic systems often include electronic devices that communicate signals among each other. Designers of electronic systems strive to increase the speed of the communication among devices while keeping the communication link robust. Wireless connections can be more robust than wired connections because of the elimination of the need for mechanical contact for communication that may be susceptible to wear. Wireless interfaces typically communicate using radio frequency (RF) signals. However, some limitations of RF communication interfaces include bandwidth limitations, signal interference, and overhead associated with RF protocols. Optical signals can be an alternative to RF and can achieve higher data rates. However, traditional optical interconnects require special fiber-optic cables, which can be more expensive than wired interfaces, and can require air tight glass-to-glass connections to prevent Fresnel reflections, making them less desirable and, in certain examples, impractical for day-to-day free-air interconnects. There is a general need for high-speed, low-cost, more robust devices, systems, and methods for high-speed interconnections among electronic devices.

DETAILED DESCRIPTION

Figure 1:
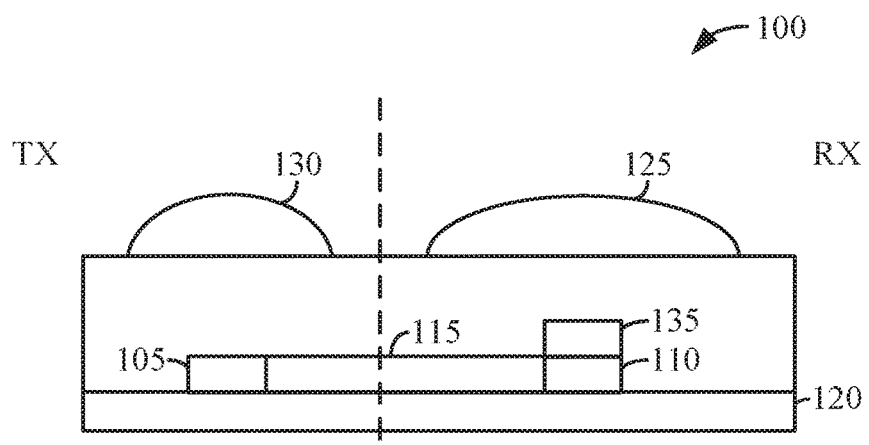
FIG. 1 is an illustration of an optical transmitter (TX) receiver (RX) pair in accordance with some embodiments.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

With increasing circuit speeds and decreasing board sizes, the physical limit for routing parallel high-speed copper interconnects is approaching. A faster alternative is desired to transport high-speed signals, such as within the board or otherwise within a system. With reducing rise times and longer trace lengths, it is also desired that the interconnect be robust and have high noise immunity. Power and cost, as well as ease of use, are also desired.

As such, it is desirable to implement a wireless communication interface that can provide improved data rate and can adapt basic wireless interconnection with existing protocols (e.g., universal serial bus (USB), mobile industry processor interface (MIPI), peripheral component interconnect (PCI), PCI express (PCIe), high definition multimedia interface (HDMI), Thunderbolt (TBT), display port (DP), or other serial busses and serial-parallel busses used in consumer electronics, enterprise class devices, wearable electronic devices, portable computers, or tablet computers), yet not be tied to any one specific protocol. An infrared-based (IR-based) interface is an alternative to an RF interface, but an IR-based interface involves conversion between protocols, which adds overhead to the communication. A laser-based optical interface requiring a fiber-optic cable or interconnect can meet these requirements for the interconnection, but the cost of fiber-optic based optical interconnections, as well as the high power and strict connection requirements for high noise immunity, can be prohibitive.

A laser-based optical communication interface, such as a light amplitude modulation docking adapter (LAMDA), does not require fiber optics to transmit and receive the laser emitted signals, but instead can transmit an optical signals via free-air space. This can be accomplished by communicating the optical signals over short distances (e.g., about ten millimeters, or 10 mm) so that signal loss is tolerable. The free-air optical interface can scale to data rates up to ten gigabits per second (10 Gbps) (20 Gbps duplex communication, e.g., for USB 3.1 and above), and rates of one terabit per second (1 Tbps) or more may be available. This type of optical interface is not tied to any specific protocol and eliminates protocol overhead, which reduces the latency in communication to near zero latency. Further, the optical interface is agnostic to clock rate, making the interface compatible with high-speed and low-speed interfaces.

Optical communication interfaces, such as LAMDA, must have sufficient line of sight alignment between transmitter (TX) and receiver (RX) sections of master and slave devices, host and coupled devices, etc. For example, alignment accuracy of +/−0.75 mm may be required for a speed of 10 Gbps per lane at a separation distance of 5 mm for laser power not exceeding 30 mW at a frequency of 860 nm. An angular misalignment up to 3 degrees would be exceptional for a 20 Gbps full-duplex communication link. In other examples, for communication over longer distances, or where a direct line-of-sight is impossible, a hollow-core or air-core fiber (e.g., a photonic bandgap or other hollow or air-core fiber, etc.) can be used.

The present inventor has recognized, among other things, interconnects for free-air optical communication, as well as interconnects between fiber connections, such as hollow-core fiber bandgap fiber. The LAMDA interface disclosed herein can extend existing consumer and enterprise grade attach mechanisms to optical communication, in certain examples, without the strict attach mechanisms of fiber core communication, and without glass-glass mating requirements, requiring only sufficient line of sight alignment and gap adherence (e.g., 10 mm, etc.), such that complex mechanisms are not required. The LAMDA interface can be advantageous if, among other things, a direct line-of-sight is available, and speed, cost, or other conditions make copper wire routing difficult or costly (e.g., across hinges, short distances (e.g., board-to-board, or other high copper-routing complexity), connector space, confined space, high use, etc.). In other examples, such as when a direct line-of-sight is not available, or if the transmission distance is greater than a threshold distance (e.g., 10 mm, or one or more other distances, depending on the desired power level of the free-air optical communication, etc.), a hollow or air-core medium (e.g., fiber, tube, channel, etc.) can be used, for example, within or in combination with a standard connector (e.g., USB, etc.), and the laser emitter, photodiode, and trans-impedance amplifier disclosed herein.

Whereas a hollow or air-core medium is advantageous over a traditional or normal-core medium from an efficiency standpoint, a traditional or normal-core medium (e.g., a traditional glass or plastic optical fiber, etc.) can be used in low-cost or short-distance applications, still taking advantage of the free-air optical interconnect (e.g., non-contact coupling, simple, lack of required physical or mechanical attachment, etc.), but operating with a reduced efficiency in contrast to the hollow or air-core medium, and taking advantage of Further, at the present time, traditional or normal-core mediums are more common and cheaper than equivalent hollow or air-core mediums.

From a user perspective, the learning curve is insignificant, as the free-air optical interconnects disclosed herein look and behave the same as existing, common connectors, with the advantage of high-speed free-space optical interconnection. From a manufacturing perspective, a clean room environment is not required for production of such interfaces, reducing the cost of production. Further, laser product level Class 1 certification is also achievable, as the small free-air interconnects disclosed herein (e.g., 0.8 mm×0.6 mm×0.2 mm, etc.) can be embedded deep inside a connector, and can be suitable for any size, even wearable, devices. The LAMDA interface disclosed herein can further enable routing high speed signals in large systems, such as all-in-one (AIO) systems, or across docking components, in the case of laptops, tablets, phones, or convertibles. Moreover, such free-air communication can provide a secure interface for data transfer, more secure than Thunderbolt (TBT), peripheral component interconnect (PCI), PCI-Express (PCIe), RF, or other interconnects. As physical contact is not required, hermetically sealed communication is now a possibility, using sealed optical interconnects. The bit-to-bit cost of data communication is also cheaper than RF counterparts. For example, using full duplex communication at full speed, the LAMDA interconnects and communications systems and methods can require only 80 mW for a 20 Gbps system, compared to 300 mW for a USB 3.0 repeater. Accordingly, the LAMDA interconnect disclosed herein represents a significant power savings.

FIG. 1 is an illustration of an embodiment of an optical communication interface including an optical transmitter (TX) receiver (RX) pair 100. The optical TX/RX pair 100 can include a laser emitter 105, such as a laser diode or a vertical-cavity surface emitting laser (VCSEL) for example. The optical receiver can include a photodiode (PD) 110 to convert received laser energy into an electrical signal. When laser light falls on the photodiode 110, it produces a photo diode current. The current produced is proportional to the amount of laser light incident on the photodiode 110. When the laser light is modulated, the photodiode current varies with the intensity of the incident laser light.

A trans-impedance amplifier 115 (TIA) can be used to amplify the electrical signals generated by the photodiode 110. In some examples, the TIA 115 provides an average of the photodiode current generated by the photodiode 110. The laser emitter 105, the photodiode 110 and the TIA 115 are arranged on a substrate 120. Some examples of the substrate 120 include a printed circuit board (PCB) made of plastic, plastic laminate (E.g., FR4) or ceramic.

To form a serial duplex optical interface, a second optical TX/RX pair can be positioned opposite the optical TX/RX pair 100 in FIG. 1 (e.g., a first optical TX/RX pair). The laser emitter of the second optical TX/RX pair is arranged opposite the optical receiver of the first optical TX/RX pair to create a first communication lane, and the laser emitter of the first optical TX/RX pair is arranged opposite the optical receiver of the second TX/RX pair to form a second communication lane in the reverse direction from the first communication lane. An air gap separates the two TX/RX pairs. The separation between the first and second optical TX/RX pairs is small (e.g., about 2.5 mm). The small separation allows for the receivers to reliably detect the laser energy from the laser emitters. Each TX/RX pair can include a lens 125 to focus incident laser energy onto the photodiode 110. Each TX/RX pair may also include a second lens 130 to focus the emitted laser energy toward the receiving photodiode across the air gap. The lenses 125, 130 may be epoxy molded lenses.

In some embodiments, the photodiode 110 has a wide spectral response (e.g., an indium gallium arsenide (InGaAs) photodiode). The wide spectral response is desirable for detection of laser energy transmitted over air, but can cause problems of crosstalk between the two communication lanes. To reduce or eliminate crosstalk between communication lanes, a laser bandpass filter 135 is arranged above the photodiode 110 of each TX/RX pair. In some embodiments, the laser bandpass filter 135 can be a Lyot filter or a dichroic filter arranged above the photodiode 110. In some embodiments, the laser bandpass filter 135 is formed as a coating (e.g., an anti-reflective coating, or ARC) on the photodiode using ion beam sputtering (IBS). In some embodiments, the laser bandpass filter 135 is formed as a coating on the lens 125.

The laser bandpass filter 135 of a TX/RX pair has a passband that excludes the center frequency of the laser energy emitted by the laser emitter 105 of the TX/RX pair, but the passband includes the center frequency of the laser energy emitted by the laser emitter of the communication lane of the photodiode 110. Thus, the laser bandpass filter 135 reduces or eliminates laser energy from one communication lane from being detected by the other communication lane. In some embodiments, the center frequency of a laser emitter is assigned based on whether the laser emitter is included in a host device (e.g., a computing device or a mobile communication device) or a peripheral device (e.g., a disk drive). If a TX/RX pair is included in a host device, the TX/RX pair includes a laser emitter having a first center frequency and a laser bandpass filter that excludes the first center frequency. If a TX/RX pair is included in a peripheral device, the TX/RX pair includes a laser emitter having a second center frequency and a laser bandpass filter that excludes the second center frequency and passes the first center frequency. The TX/RX pair of the host device includes a laser bandpass filter that passes the second center frequency. Thus, the passband of the laser bandpass filter may be selected according to whether the TX/RX pair is included in the host device or peripheral device.

Figure 2:
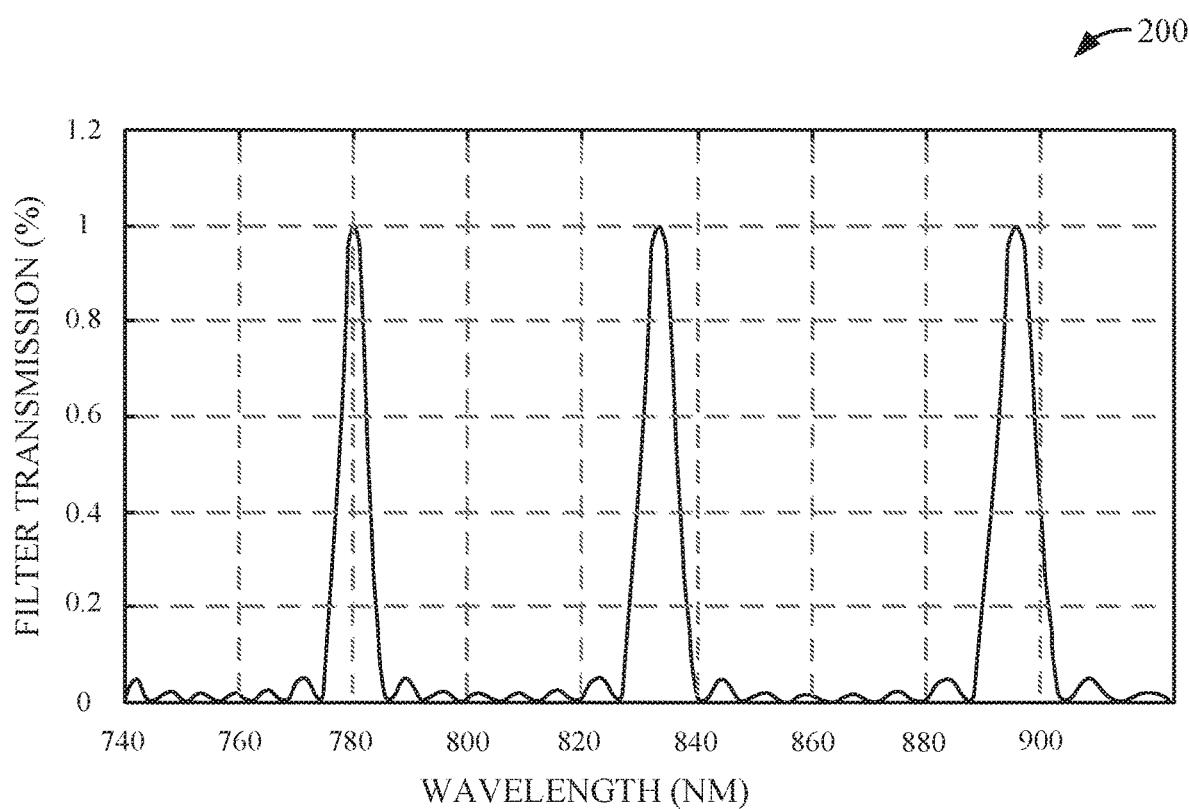
FIG. 2 is an illustration of a filter characteristic for a laser bandpass filter in accordance with some embodiments.

FIG. 2 is an illustration of a filter characteristic for a laser bandpass filter 200. The example is intended to be illustrative and non-limiting. The filter characteristic shows filter transmission versus wavelength. In the example, a host device laser emitter emits laser energy with a wavelength of 855 nanometers (nm), and a peripheral laser emitter emits laser energy with a wavelength of 830 nm. FIG. 2 shows an example of a filter characteristic for the host device. The filter shows very high attenuation at 855 nm and shows that the passband of the filter includes 830 nm.

Figure 3:
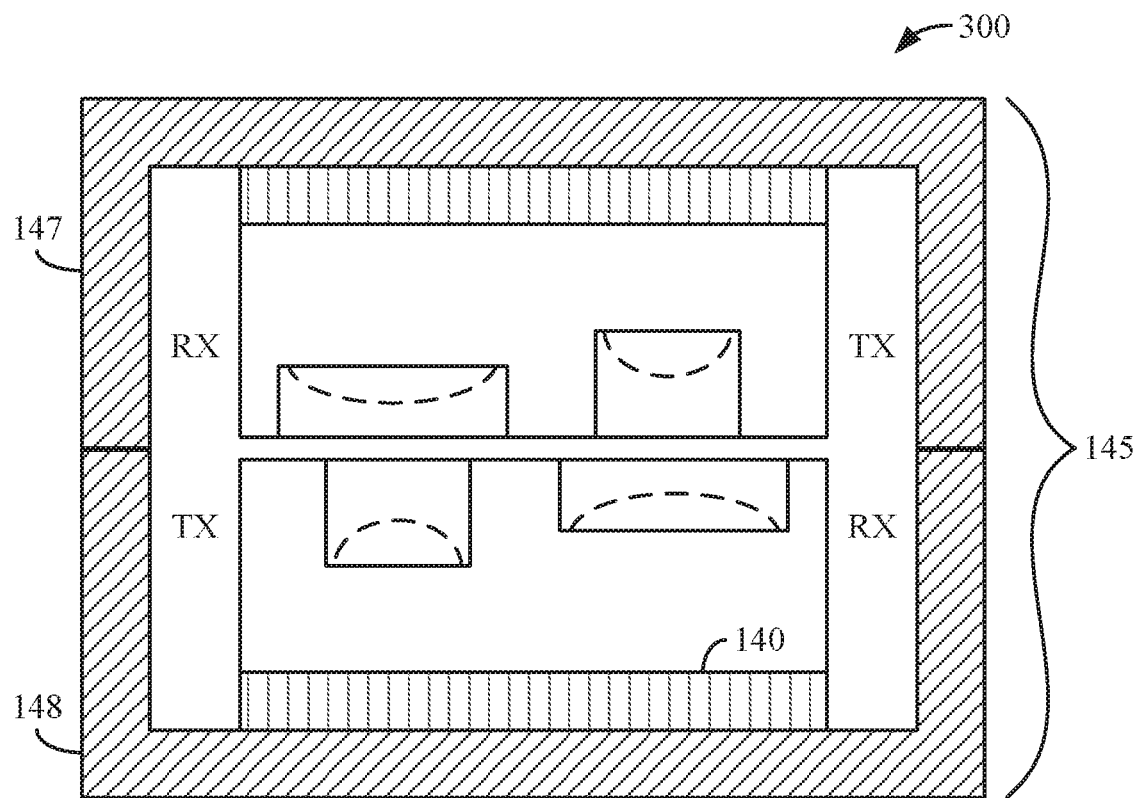
FIG. 3 is an illustration of an arrangement of optical TX/RX pairs in accordance with some embodiments.

FIG. 3 is an illustration of two optical TX/RX pairs arranged to form a duplex serial optical interface 300, including a mechanical connector 145 to house the interface and protect against interference from outside sources. The mechanical connector 145 may include first connector body portion 147 housing a first optical TX/RX pair (such as that illustrated in FIG. 1), and a second connector body portion 148 housing a second optical TX/RX pair, positioned opposite the first optical TX/RX pair to create a first and second communication lanes in reverse directions.

The first and second connector body portions 147, 148 can be coupled using one or more attach mechanisms. For example, the attach mechanism can include an adhesion-based attach mechanism (e.g., tape, glue, or one or more other adhesion-based mechanisms), a magnetic attach mechanism (e.g., permanent or fixed magnets, etc.), an electro-static attach mechanism, a mechanical attach mechanism, or a chemical attach mechanism, etc.

An air gap separates the two TX/RX pairs. The separation between the two optical TX/RX pairs is small (e.g., about 2.5 mm). The small separation allows for the optical receivers to reliably detect the laser energy from the laser emitters. The optical TX/RX pairs also include lenses. Portions of the lenses may have different curvature. The first lens portion may focus laser energy received across the air gap from a laser emitter onto a photodiode, and the second lens portion may focus laser energy from a laser emitter transmitted across the air gap toward a photodiode.

An optical TX/RX pair may be electrically connected to logic circuitry 140. The logic circuitry 140 transmits and receives signals communicated according to a duplex communication protocol, such as a USB protocol. In certain embodiments, the logic circuitry 140 may be arranged on one or both of the substrates. In some variations, one or both of the substrates are electronics package substrates and the laser emitters, the photodiodes, and the logic circuitry may be included in the same electronics package.

The center frequency of a laser emitter may be assigned based on the type of device. For example, the optical TX/RX pair of the second connector body portion 148 may be included in a host device, and the optical TX/RX pair of the first connector body portion 147 may be included in a peripheral device (e.g., a disc drive). The laser emitter of the host device TX/RX pair may emit laser energy at a first center frequency and may include a laser bandpass filter that excludes the first center frequency. The laser emitter of the peripheral device TX/RX pair may emit laser energy at a second center frequency and may have a laser bandpass filter that excludes the second center frequency and passes the first center frequency. The laser bandpass filter of the host device TX/RX pair passes the second center frequency. Therefore, the passband of the laser bandpass filter may be selected according to the type of device in which the TX/RX pair is included.

In certain embodiments, the substrate is an electronics package substrate and a laser emitter, a photodiode, and the logic circuitry 140 may be included in the same electronics package. Data is sent between devices or between optical links of the optical interface by transmitting laser energy via free air. It is desirable to keep the laser power low and also to prevent the laser emitters from firing into free air without any mechanical protective cover. This prevents the optical interface from exceeding class 1 laser certification. For consumer class devices, it is desirable for safety reasons to keep the laser emitters off until the two connector portions are joined and the two links of the optical interconnection are completely covered without laser light leaking or reflecting out from any side of the connector.

Figure 4:
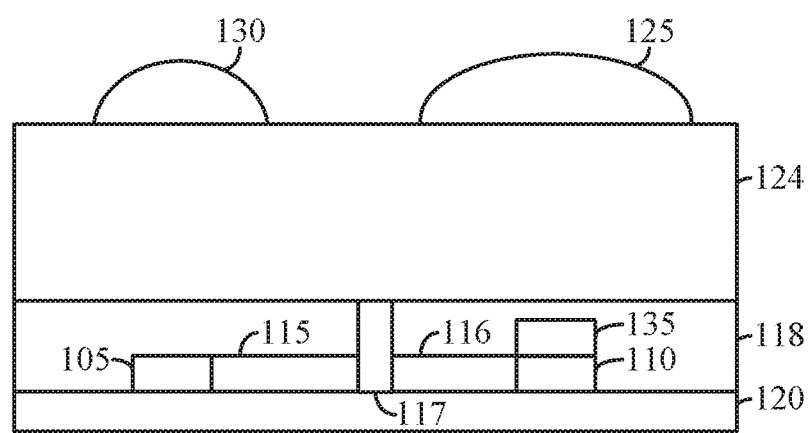
FIG. 4 is an illustration of an optical transmitter (TX) receiver (RX) pair in accordance with some embodiments.

FIG. 4 is an illustration of an optical transmitter (TX) receiver (RX) pair 400. The optical TX/RX pair can include a laser emitter 105, such as a laser diode or a vertical-cavity surface emitting laser (VCSEL) for example. The optical receiver can include a photodiode 110 to convert received laser energy into an electrical signal. A trans-impedance amplifier 116 (TIA) can be used to amplify the electrical signal generated by the photodiode 110. A drive amplifier 115 may also be included to translate signals to be transmitted to levels of power or voltage needed to drive the laser emitter 105. The laser emitter 105 and the photodiode 110 are arranged on a substrate 120. Some examples of the substrate 120 include a printed circuit board (PCB) made of plastic, a plastic laminate (e.g., FR4), or ceramic.

A resin 118 may be disposed on the substrate to encapsulate the electronics. The resin may be an optically clear resin (OCR) that flows before hardening. However, OCR may be susceptible to scratching. Because the optical interface is exposed to air rather than being protected using connections to fiber-optics, the optical TX/RX pair may need a surface with a higher degree of hardness than a resin can provide.

The optical TX/RX pair can include a lens 124. The lens may have a surface hardness rating of 8H or higher. The lens 124 can include a first lens portion 125 having a first curvature arranged above the photodiode 110 and a second lens portion 130 having a second curvature arranged above the laser emitter 105. The lens may be pre-formed prior to assembly and may include alumina silicate glass or a co-polymer coated poly (methyl methacrylate) (PMMA), such as sol-gel coated PMMA for example. The lens may have the same refractive index as the OCR to prevent reflections at the OCR/lens interface. The lens may also provide protection from humidity. An isolation barrier 117 may be arranged on the substrate between the laser emitter and the photodiode. The isolation barrier 117 may extend from the substrate to the top surface of the resin and may also serve as a support for the lens during curing of the resin.

It may be desirable to use a photodiode 110 that has a wide spectral response (e.g., an indium gallium arsenide (InGaAs) photodiode). The wide spectral response is desirable for detection of laser energy transmitted over air, but can cause problems of crosstalk between communication lanes, such as the two communication lanes of FIG. 3. To reduce or eliminate crosstalk between communication lanes, a laser bandpass filter 135 is arranged above the photodiode 110 of each TX/RX pair. In some embodiments, the laser bandpass filter can be a Lyot filter or a dichroic filter arranged above the photodiode. In some embodiments, the laser bandpass filter 135 is formed on a surface of the lens 124 that contacts the resin. The coating may be a thin film coating (e.g., an anti-reflective coating, or ARC) formed using ion beam sputtering (IBS) included on the surface of the lens contacting the resin.

The laser bandpass filter 135 of the TX/RX pair has a passband that excludes the center frequency of the laser energy emitted by the laser emitter of the same TX/RX pair, but the passband includes the center frequency of the laser energy emitted by the laser emitter opposite the photodiode in the communication lane of the photodiode. Thus, the laser bandpass filter 135 reduces or eliminates laser energy from one communication lane from being detected by the other communication lane.

Figure 5:
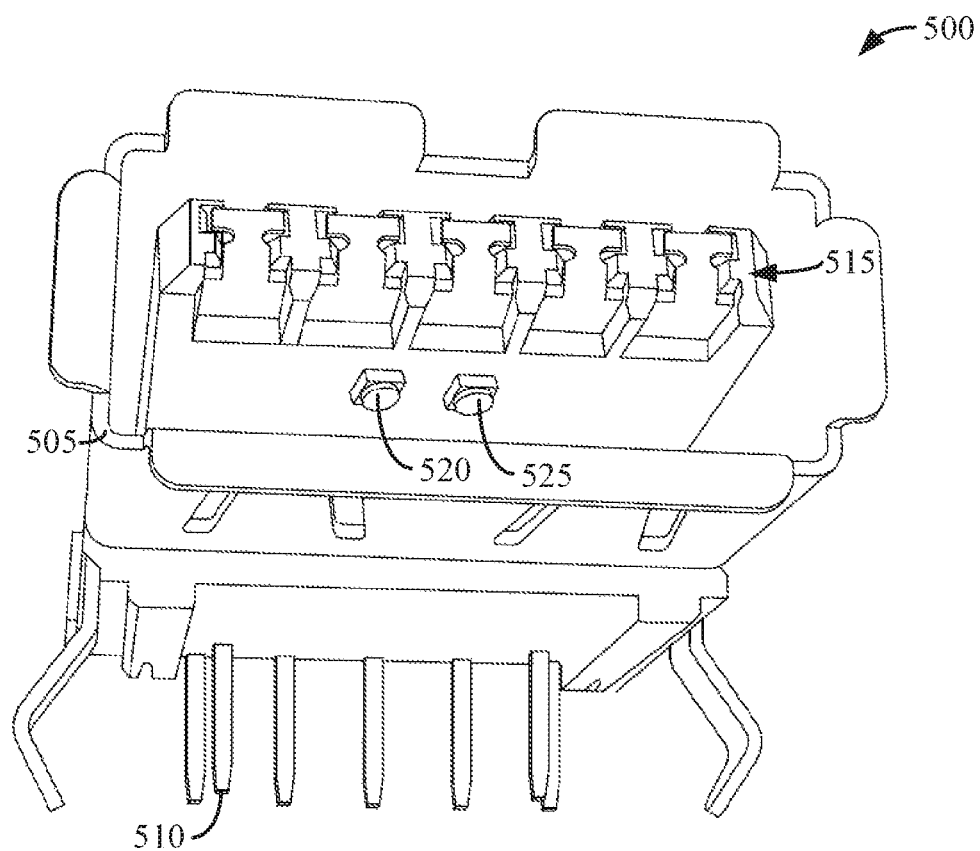
FIG. 5 is an illustration of a LAMDA inside socket co-molded along a plastic pin carrier in accordance with some embodiments.

FIG. 5 is an illustration of a free-air optical interconnect (e.g., a LAMDA inside socket) co-molded inside a connector 500. In the example of FIG. 5, the connector 500 includes an existing female USB connector (including a housing 505, pins 510, and traditional connectors 515) modified to contain a LAMDA inside socket, including an optical receiver (RX) 520 and an optical transmitter (TX) 525. In other examples, the existing plastic pin carrier 500 can include one or more other connector, such as a Thunderbolt (TBT) connector, a USB Type C connector, a High-Definition Multimedia Interface (HDMI) connector, a Display Port (DP) connector, etc., each modified to include a free-air optical interconnect (e.g., LAMDA).

As illustrated in FIG. 5, the small size of each TX/RX components can allow placement in an existing connector, without greatly altering the function or design of the existing connector. Accordingly, such existing connector, in certain examples, may still retain its original functionality, as well as contain such new free-air optical interconnect. Further, to any component coupled to such plastic pin carrier 500, such data may be routed in such a way that coupled electronic components don't see incoming or outgoing data any differently, only having a transmission medium allowing faster data rates.

Figure 6:
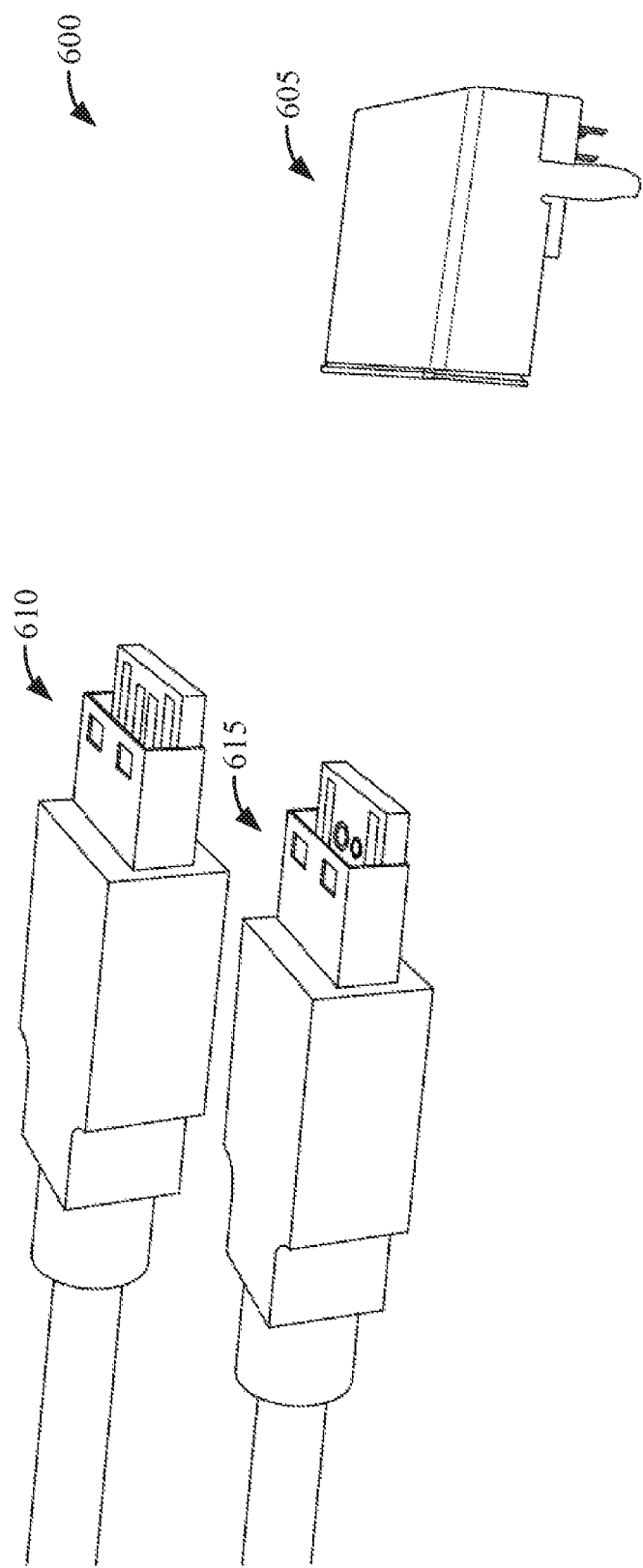
FIG. 6 is an illustration of USB socket compatible copper and optic cables and a LAMDA inside socket in accordance with some embodiments.

FIG. 6 is an illustration of a system 600 including USB-socket compatible copper and optic cables 610, 615, respectively, and a connector 605 including a LAMDA inside socket. As illustrated in FIG. 6, such connector 605 can be configured to receive both traditional connection interfaces (e.g., standard USB cables) as well as modified free-air optical interface connection interfaces (e.g., optic cables). In certain examples, from a host-side, both of the copper and optic cables 610, 615 can share the same socket and electronics. In an example, the optic cable 615 can include a hollow-core photonic band-gap fiber.

Figure 7:
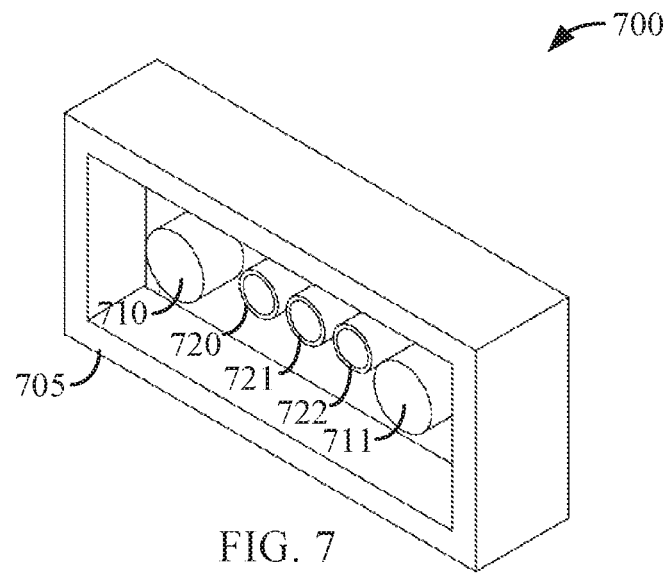
FIG. 7 is an illustration of a magnetic attach connector in accordance with some embodiments.

FIG. 7 is an illustration of a magnetic attach connector 700 carrying multiple lanes of high-speed data. In an example, the magnetic attach connector 700 can include a housing 705 having a magnetic ring, first and second end pins 710, 711 carrying power (e.g., VCC, ground, etc.), and hollow center pins 720, 721, 722 carrying data (e.g., multiple lanes of 20 Gbps data links, etc.). In an example, such hollow center pins 720, 721, 722 may retain the functionality of similar, center data pins (e.g., non-hollow center pins carrying traditional data, etc.).

Figure 8:
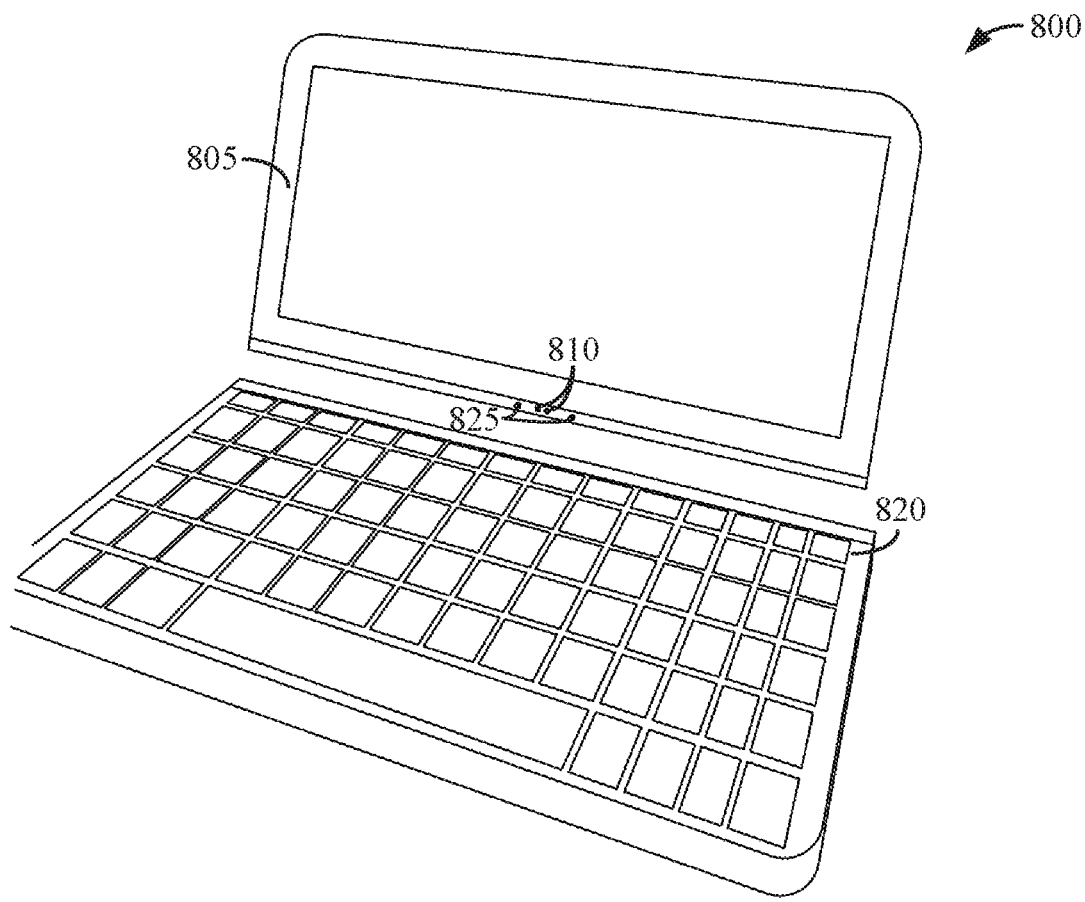
FIG. 8 is an illustration of a detachable two-in-one device in accordance with some embodiments.

FIG. 8 is an illustration of a detachable two-in-one device 800 including a tablet device 805, a keyboard 820, and a free-air optical interconnect 810, including an optical transmitter (TX) receiver (RX) pair, and alignment features, such as alignment pins 825, configured to couple and communicate data between the keyboard 820 and the tablet device 805. The alignment pins 825 of the tablet device 805 can include physical protrusions configured to mate with corresponding depressions on the keyboard 820 in such a way to ensure proper alignment of and distance between the free-air optical interconnect 810 of the tablet device 805 and a corresponding free-air optical interconnect of the keyboard 820. In other examples, the alignment features can include mechanical, snap-fit, interference, magnetic, hook-and-loop, electrostatic, chemical, or other attachment or alignment features.

In other examples, the protrusions can be on the keyboard 820, and the depressions can be on the tablet device 805. Although illustrated in FIG. 8 as a tablet device 805 and a keyboard 820, in other examples, such free-air optical interconnects and alignment features can be applied to other devices and accessories.

Figure 9:
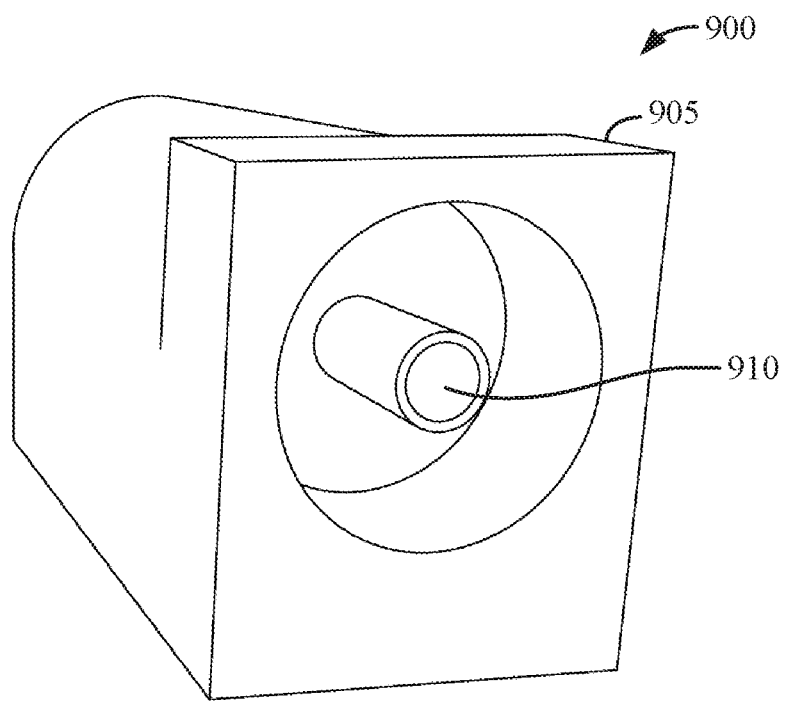
FIG. 9 is an illustration of a DC barrel in accordance with some embodiments.

FIG. 9 is an illustration of a DC connector 900 including a female DC socket housing 905 including a hollow barrel 910. Traditional DC sockets include a solid barrel, typically for carrying a power connection, such as V+. The hollow barrel 910 of the DC connector 900 can be modified to contain a free-air optical interconnect (e.g., LAMDA) in the female DC socket 910, including a transmitter (TX), a receiver (RX), or both, as well as provide power using the remaining conductor of the hollow barrel 910. Further, contact strips on one or more other surface of the DC connector 900 can be used to provide a second power connection, such as circuit ground, etc.

Figure 10:
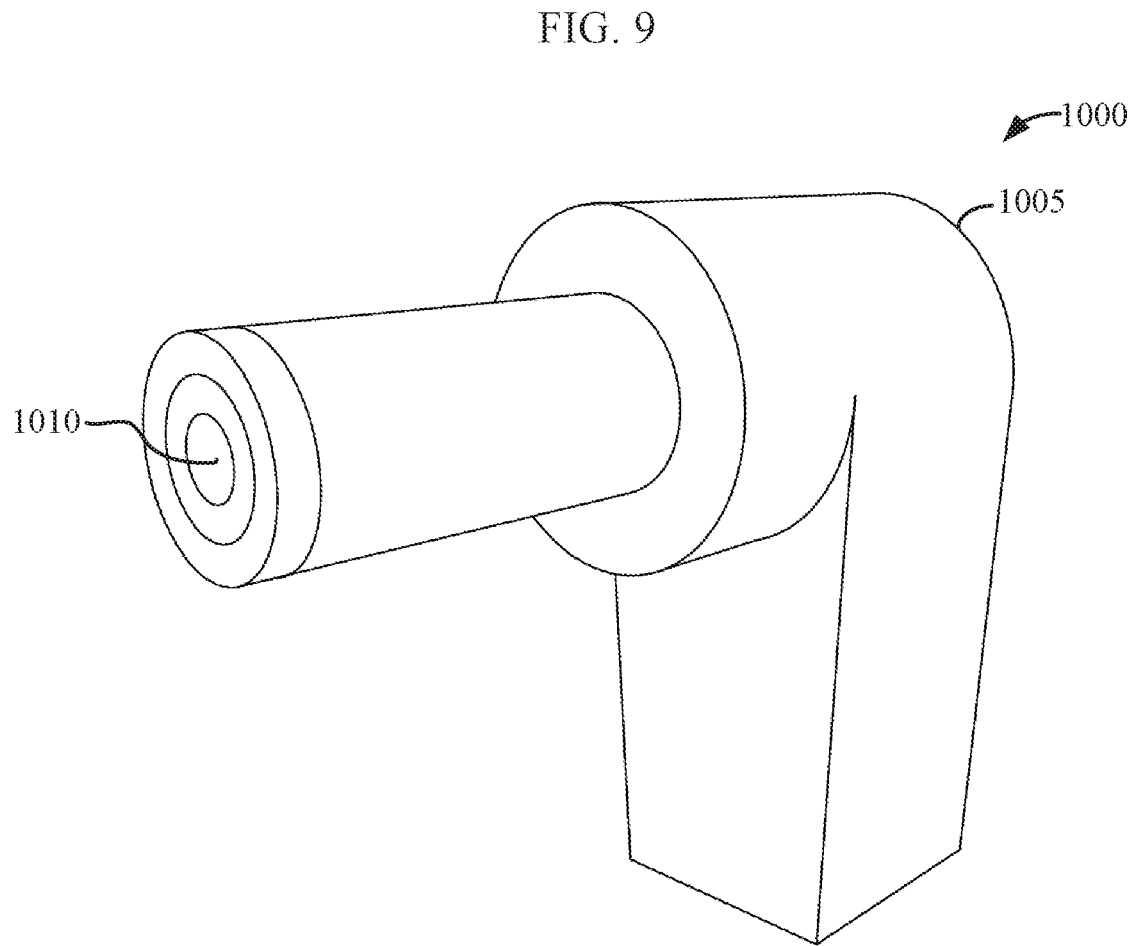
FIG. 10 is an illustration of a DC plug in accordance with some embodiments.

FIG. 10 is an illustration of a DC connector 1000 including a male DC plug housing 1005 including a hollow barrel 1010 having a free-air optical interconnect (e.g., LAMDA) placed concentric with the hollow barrel 1010. Traditional DC plugs carry only power connections. The DC connector 1000 illustrated herein includes a free-air optical interconnect, for example, molded into the male DC plug housing 1005. The hollow barrel 1010 can receive a pin of a DC jack, such as a V+ power connection from a female DC socket. Further, placement of the pin of the DC jack into the hollow barrel 1010 can enable proper optical alignment with a host device, such as that illustrated in FIG. 9.

Figure 11:
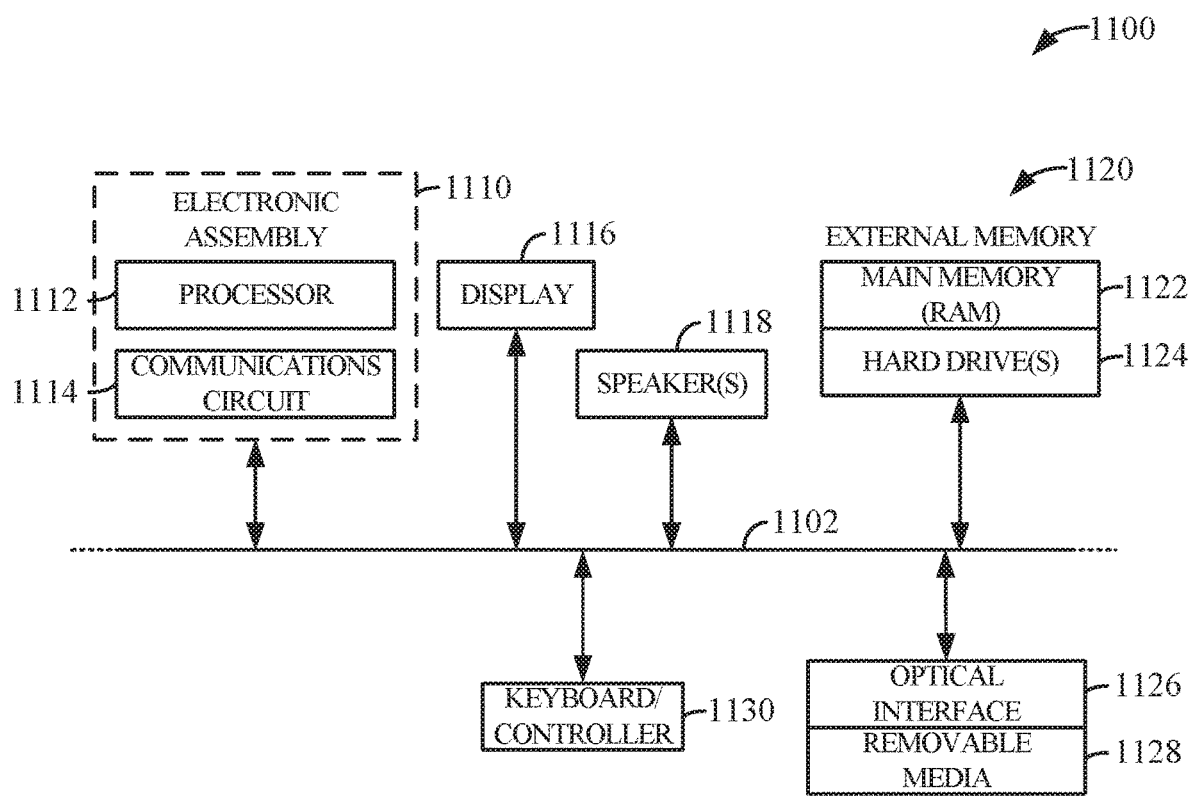
FIG. 11 is a block diagram of an example electronic system in accordance with some embodiments.

FIG. 11 is an illustration of a block diagram of an electronic system 1100 incorporating at least one electronic circuit assembly and in accordance with at least one embodiment of the invention. Electronic system 1100 is merely one example in which embodiments of the present invention can be used. Examples of electronic systems include, but are not limited to personal computers, tablet computers, mobile telephones, game devices, compute sticks etc. In this example, electronic system 1100 comprises a data processing system that includes a system bus 1102 to couple the various components of the system. System bus 1102 provides communications links among the various components of the electronic system 1100 and can be implemented as a single bus, as a combination of busses, or in any other suitable manner.

An electronic assembly 1110 can be coupled to system bus 1102. The electronic assembly 1110 can include any circuit or combination of circuits. In one embodiment, the electronic assembly 1110 includes a processor 1112 which can be of any type. As used herein, "processor" means any type of computational circuit, such as but not limited to a microprocessor, a microcontroller, a complex instruction set computing (CISC) microprocessor, a reduced instruction set computing (RISC) microprocessor, a very long instruction word (VLIW) microprocessor, a graphics processor, a digital signal processor (DSP), multiple core processor, or any other type of processor or processing circuit.

Other types of circuits that can be included in electronic assembly 1110 are a custom circuit, an application-specific integrated circuit (ASIC), or the like. The electronic assembly can include a communications circuit 1114 for use in wireless devices like mobile telephones, personal data assistants, portable computers, two-way radios, and similar electronic systems.

The electronic system 1100 can also include an external memory 1120, which in turn can include one or more memory elements suitable to the particular application, such as a main memory 1122 in the form of random access memory (RAM), one or more hard drives 1124. The electronic assembly 1110 can also include a free-air optical interface 1126 for removable media 1128 such as compact disks (CD), flash memory cards, digital video disk (DVD), and the like.

The electronic system 1100 can also include a display device 1116, one or more speakers 1118, and a keyboard and/or controller 1130, which can include a mouse, trackball, touch screen, voice-recognition device, or any other device that permits a system user to input information into and receive information from the electronic system 1100.

ADDITIONAL DESCRIPTION AND EXAMPLES

These several embodiments and examples can be combined using any permutation or combination. The Abstract is provided to allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

In Example 1, a system includes a communication interface including separate electrical connectors configured to communicate power and ground using electrical conductors, wherein the communication interface includes a free-air optical interconnect including at least one of a laser emitter configured to transmit laser energy across an air gap to a separate device, or a photodiode configured to detect laser energy received across the air gap from the separate device.

In Example 2, the free-air optical interconnect of Example 1 optionally includes a laser emitter configured to transmit laser energy across an air gap to a separate device, and a photodiode configured to detect laser energy received across the air gap from the separate device.

In Example 3, the communication interface of one or more of Examples 1-2 optionally includes separate electrical connectors configured to communicate data using electrical conductors.

In Example 4, the free-air optical interconnect of one or more of Examples 1-3 is optionally co-molded in the communication interface with the separate electrical connectors.

In Example 5, the communication interface of one or more of Examples 1-4 optionally includes a USB interface including separate electrical connectors including power, ground, and data connections, and the free-air optical interconnect.

In Example 6, the USB interface of one or more of Examples 1-5 optionally includes a female USB interface configured to receive a male USB cable.

In Example 7, the communication interface of one or more of Examples 1-6 optionally includes a DC connector including a hollow barrel configured to house the free-air optical interconnect.

In Example 8, the communication interface of one or more of Examples 1-7 optionally includes an alignment feature configured to ensure proper alignment between the communication interface and a separate device.

In Example 9, the alignment feature of one or more of Examples 1-8 optionally includes a magnetic alignment feature.

In Example 10, a method includes communicating power and ground using separate electrical connectors of a communication interface, and communicating data using a free-air optical interconnect of the communication interface, the free-air optical interface including at least one of a laser emitter configured to transmit laser energy across an air gap to a separate device, or a photodiode configured to detect laser energy received across the air gap from the separate device.

In Example 11, the free-air optical interconnect of Example 10 optionally includes a laser emitter configured to transmit laser energy across an air gap to a separate device and a photodiode configured to detect laser energy received across the air gap from the separate device.

In Example 12, the communicating data using the free-air optical interconnect of any one or more of Examples 10-11 optionally includes at least one of transmitting laser energy across an air gap to a separate device using a laser emitter, or detecting laser energy received across the air gap from the separate device using a photodiode.

In Example 13, the communication interface of any one or more of Examples 10-12 optionally includes separate electrical connectors configured to communicate data using electrical conductors.

In Example 14, the free-air optical interconnect of any one or more of Examples 10-13 is optionally co-molded in the communication interface with the separate electrical connectors.

In Example 15, the communication interface of any one or more of Examples 10-14 optionally includes a USB interface including separate electrical connectors including power, ground, and data connections, and the free-air optical interconnect.

In Example 16, the USB interface of any one or more of Examples 10-15 optionally includes a female USB interface configured to receive a male USB cable.

In Example 17, the communication interface of any one or more of Examples 10-16 optionally includes a DC connector including a hollow barrel configured to house the free-air optical interconnect.

In Example 18, the communication interface of any one or more of Examples 10-17 optionally includes an alignment feature configured to ensure proper alignment between the communication interface and a separate device.

In Example 19, the alignment feature of any one or more of Examples 10-18 optionally includes a magnetic alignment feature.

In Example 20, a system includes means for communicating power and ground using separate electrical connectors of a communication interface and means for communicating data using a free-air optical interconnect of the communication interface, the free-air optical interface including at least one of a laser emitter configured to transmit laser energy across an air gap to a separate device, or a photodiode configured to detect laser energy received across the air gap from the separate device.

In Example 21, a system or apparatus can include, or can optionally be combined with any portion or combination of any portions of any one or more of Examples 1-20 to include, means for performing any one or more of the functions of Examples, 1-20, or a machine-readable medium including instructions that, when performed by a machine, cause the machine to perform any one or more of the functions of Examples 1-20.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, the code can be tangibly stored on one or more volatile or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A system comprising:
   a communication interface including separate electrical connectors configured to communicate power and ground using electrical conductors,
   wherein the communication interface includes a free-air optical interconnect including:
   a laser emitter contacting a first surface of a lens via resin, the laser emitter configured to transmit laser energy across an air gap at a second surface of the lens to a separate device; and
   a photodiode contacting the first surface of the lens via the resin, the photodiode configured to detect laser energy received across the air gap from the separate device.

2. The system of claim 1, wherein the communication interface includes separate electrical connectors configured to communicate data using electrical conductors.

3. The system of claim 1, wherein the free-air optical interconnect is co-molded in the communication interface with the separate electrical connectors.

4. The system of claim 1, wherein the communication interface includes a USB interface including separate electrical connectors including power, ground, and data connections, and the free-air optical interconnect.

5. The system of claim 4, wherein the USB interface includes a female USB interface configured to receive a male USB cable.

6. The system of claim 1, wherein the communication interface includes a DC connector including a hollow barrel configured to communicate one of the power or the ground and to house the free-air optical interconnect within the hollow barrel.

7. The system of claim 1, wherein the communication interface includes an alignment feature configured to ensure proper alignment between the communication interface and a separate device.

8. The system of claim 7, wherein the alignment feature includes a magnetic alignment feature.

9. A method comprising:
   communicating power and ground using separate electrical connectors of a communication interface; and
   communicating data using a free-air optical interconnect of the communication interface, the free-air optical interconnect including:
   a laser emitter contacting a first surface of a lens via resin, the laser emitter configured to transmit laser energy across an air gap at a second surface of the lens to a separate device; and a photodiode contacting the first surface of the lens via the resin, the photodiode configured to detect laser energy received across the air gap from the separate device.

10. The method of claim 9, wherein communicating data using the free-air optical interconnect includes at least one of:
   transmitting laser energy across an air gap to a separate device using a laser emitter; or
   detecting laser energy received across the air gap from the separate device using a photodiode.

11. The method of claim 9, wherein the communication interface includes separate electrical connectors configured to communicate data using electrical conductors.

12. The method of claim 11, wherein the free-air optical interconnect is co-molded in the communication interface with the separate electrical connectors.

13. The method of claim 9, wherein the communication interface includes a USB interface including separate electrical connectors including power, ground, and data connections, and the free-air optical interconnect.

14. The method of claim 13, wherein the USB interface includes a female USB interface configured to receive a male USB cable.

15. The method of claim 9, wherein the communication interface includes a DC connector including a hollow barrel configured to communicate one of the power or the ground and to house the free-air optical interconnect within the hollow barrel.

16. The method of claim 9, wherein the communication interface includes an alignment feature configured to ensure proper alignment between the communication interface and a separate device.

17. The method of claim 16, wherein the alignment feature includes a magnetic alignment feature.

* * * * *